United States Patent
Ono

(10) Patent No.: US 7,375,744 B2
(45) Date of Patent: May 20, 2008

(54) CAMERA SYSTEM, CAMERA CONTROL METHOD AND PROGRAM

(75) Inventor: Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 665 days.

(21) Appl. No.: 10/944,824

(22) Filed: Sep. 21, 2004

(65) Prior Publication Data

US 2006/0044390 A1    Mar. 2, 2006

(30) Foreign Application Priority Data

Sep. 2, 2004    (JP)    ............... 2004-256209

(51) Int. Cl.
*H04N 5/232*    (2006.01)
(52) U.S. Cl. ............................... 348/211.99
(58) Field of Classification Search ........... 348/211.99, 348/211.11, 211.13
See application file for complete search history.

(56) References Cited

U.S. PATENT DOCUMENTS

| | | | | |
|---|---|---|---|---|
| 4,992,866 A | * | 2/1991 | Morgan | 348/159 |
| 5,517,236 A | * | 5/1996 | Sergeant et al. | 348/143 |
| 6,803,946 B1 | * | 10/2004 | Wakiyama et al. | 348/211.6 |
| 2005/0036036 A1 | * | 2/2005 | Stevenson et al. | 348/211.99 |

* cited by examiner

*Primary Examiner*—James M. Hannett
(74) *Attorney, Agent, or Firm*—Sughrue Mion, PLLC

(57) ABSTRACT

A camera system for capturing an image of a predetermined scope, having a plurality of monitoring cameras operable to change a monitoring area respectively, comprises a camera controller, when changing its monitoring area of one of the monitoring cameras, operable to control the other monitoring cameras to monitor a dead area that is outside of the monitoring area of the monitoring camera. When the camera controller controls the monitoring camera to zoom into a subject, the camera controller may control the other monitoring cameras to monitor the dead area of the monitoring area by zooming out the subject.

7 Claims, 5 Drawing Sheets

CAMERA SYSTEM, CAMERA CONTROL METHOD AND PROGRAM

This patent application claims priority from Japanese Patent Application No. 2004-256209 filed on Sep. 2, 2003, the content of which is incorporated herein by reference.

BACKGROUND OF THE INVENTION

1. Field of the Invention

The present invention relates to a camera system and a camera control method, including a plurality of monitoring camera, and relates to a program for the camera system and the camera control method. More particularly, the present invention relates to the camera system and the camera control method for monitoring a predetermined scope by the plurality of monitoring cameras, and the computer program for controlling the plurality of the monitoring cameras.

2. Description of the Related Art

Conventionally, the monitoring system for capturing a face image of a person as an intruder with a magnified image by controlling the monitoring camera to pan and zoom in the intruder who invades into the monitoring scope has been in practical use. (For example, see the article from the J-Net Corporation's web site "http://www.gazou.co.jp/Products/index.html"; entitled "Image Monitoring System")

However, there is a problem that in the monitoring scope a dead area is generated, when capturing a specific area in more detail by controlling the camera to pan and zoom in.

SUMMARY OF THE INVENTION

Therefore, it is an object of the present invention to provide a displaying apparatus and a control method for the displaying apparatus, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a camera system for capturing an image of a predetermined scope, having a plurality of monitoring cameras operable to change a monitoring area respectively, comprises a camera controller, when changing its monitoring area of one of the monitoring cameras, the camera controller controls the other monitoring cameras to monitor a dead area that is outside of the monitoring area of the monitoring camera.

When the camera controller controls the monitoring camera to zoom into a subject, the camera controller may control the other monitoring cameras to monitor the dead area of the monitoring area by zooming out the subject.

The camera controller may regard recognition of a new subject as a trigger, and controls the monitoring camera to zoom into the new subject.

According to the second aspect of the present invention, a camera control method for monitoring a predetermined scope by a plurality of monitoring cameras operable to change its monitoring area respectively, comprises a step of: when changing a monitoring area of one of the monitoring cameras, controlling the other monitoring cameras to monitor a dead area that is outside of the monitoring area of the monitoring camera.

According to the third aspect of the present invention, a computer program medium storing thereon a program for a camera system, in order to monitor a predetermined scope by a plurality of monitoring cameras operable to change its monitoring area, the program comprises a camera controlling module, when changing its monitoring area of one of the monitoring cameras, the camera controlling module controls the other monitoring cameras to monitor a dead area that is outside of the monitoring area of the monitoring camera.

The camera controller may adjust both an exposure of one monitoring camera and an exposure of the other monitoring cameras differently, when a region of which luminance is beyond a dynamic range of the monitoring cameras is lager than a predetermined area in the predetermined scope.

The camera controller may adjust the exposure of the monitoring camera in accordance with a high luminance region, of which average luminance is the highest in the predetermined scope, and adjusts the exposures of the other monitoring cameras in accordance with a region except the high luminance region in the predetermined scope.

The camera controller may adjust each of focuses of the monitoring camera and the other monitoring cameras, in accordance with the regions, which are captured with the adjusted exposures respectively.

The summary of the invention does not necessarily describe all necessary features of the present invention. The present invention may also be a subcombination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
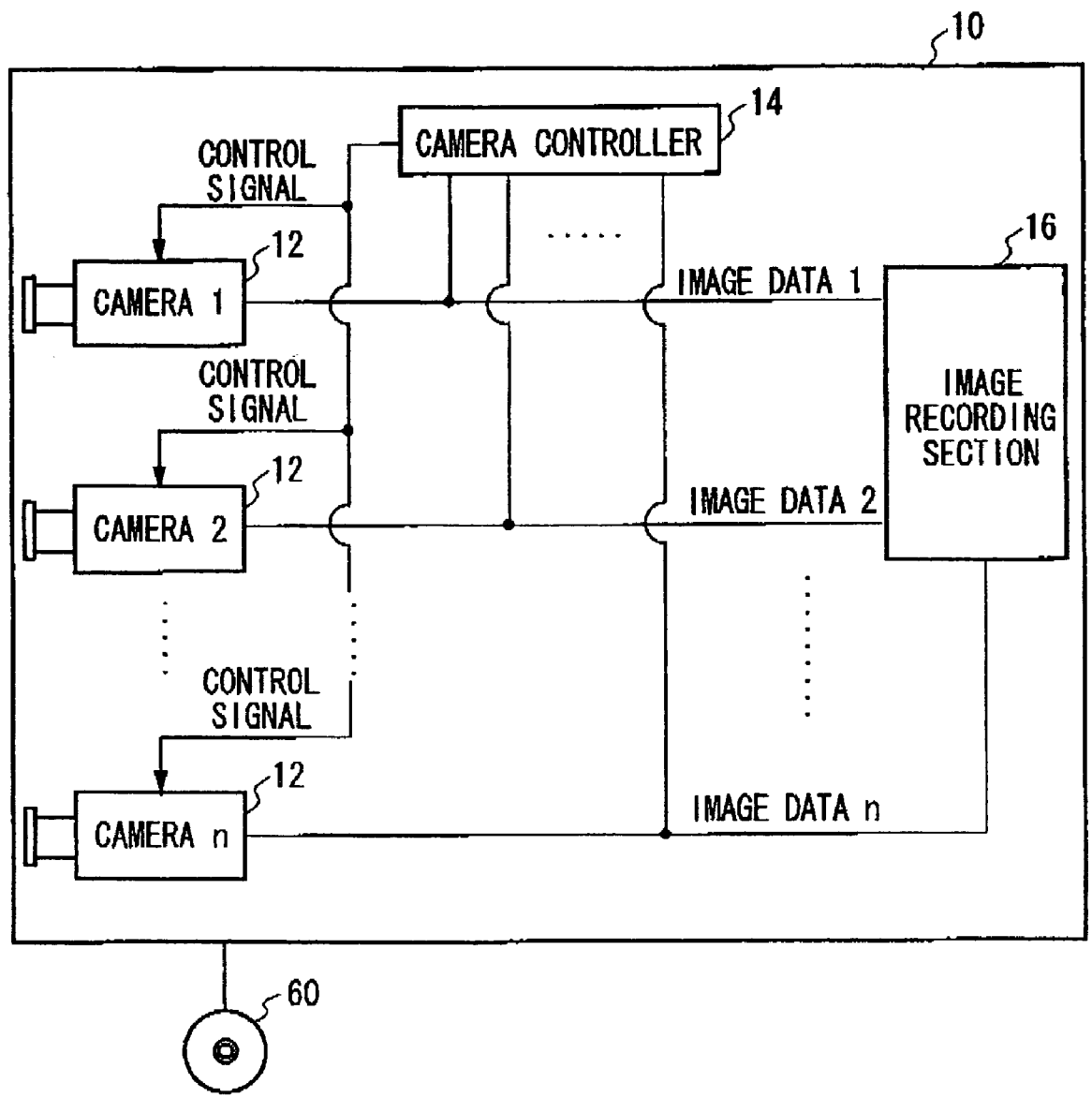
FIG. 1 is a block diagram exemplary showing a functional configuration of a camera system 10.

FIG. 1 is a block diagram exemplary showing a functional configuration of a camera system 10. According to the camera system 10 of the present invention, it is an object to capture a specific area in more detail without any dead area. In addition, the monitoring scope is an example of a predetermined scope according to the present invention.

The camera system 10 includes a plurality of monitoring cameras 12, a camera controller 14, and an image recording section 16. The plurality of monitoring cameras 12 is operable to change a monitoring area respectively. When changing a monitoring area of one of the monitoring cameras 12, the camera controller 14 controls the other monitoring cameras 12 to monitor a dead area where the monitoring camera 12 does not capture. The image recording section 16 stores each of the image data 1-*n* captured by each of the plurality of monitoring cameras 12.

Each of the monitoring cameras 12 has a predetermined monitoring area respectively, and all of the monitoring cameras 12 capture a predetermined monitoring scope as a whole. The camera controller 14 obtains each of the image data 1-*n* consecutively and then decides whether an abnormality occurs. Any method for detecting the abnormality may be used as long as a position of the abnormality is detected.

For example, the camera controller 14 stores an image in which any abnormality was not captured as a reference image in advance, and then obtains binary images by comparing a difference between each of the captured images and the reference image with a predetermined threshold. Next, if the area of the binary image is larger than a predetermined reference value, the camera controller 14 decides that some abnormalities have occurred in the corresponding part of the binary image.

If the camera controller 14 detects the abnormality in the images captured by monitoring the monitoring scope, the camera controller 14 controls both the direction and the scaling factor of the monitoring camera 12 that is monitoring the abnormal position so that the abnormal position is zoomed in. At the same time, the camera controller 14 controls each of the directions and scaling factors of the other monitoring cameras 12 that are monitoring the next area of the abnormal position, in order to capture the dead area that is generated as an area outside of the monitoring area of the monitoring camera 14 because of the operation of zooming into the abnormality.

The recording medium 60 stores a program for realizing each of the functions of the monitoring camera 12, the camera controller 14, and the image recording section 16 in the camera system 10. The camera system 10 may obtain the program through a network, and then execute the program.

Figure 2:
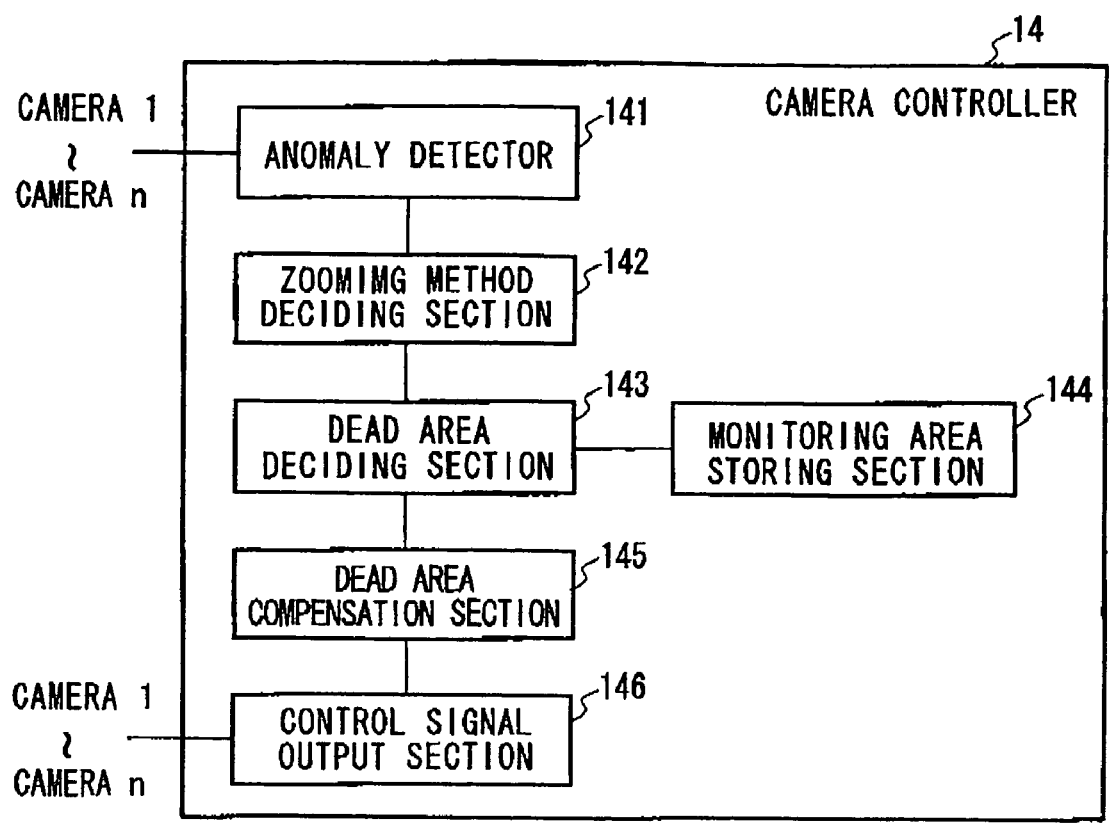
FIG. 2 is a first example showing the functional diagram of the camera controller 14.

FIG. 2 is a first example showing the functional diagram of the camera controller 14. The camera controller 14 includes an abnormality detector 141, a zooming method deciding section 142, a dead area deciding section 143, a monitoring area storing section 144, a dead area compensation section 145 and a control signal output section 146. The abnormality detector 141 acquires each of the image data 1-*n* from the monitoring cameras 12, and decides whether an abnormality has occurred, and decides the position of the abnormality. The zooming method deciding section 142 selects the monitoring camera 12 in order to capture the abnormal position in more detail when the abnormality has occurred, and then decides the monitoring area to be zoomed in by the selected monitoring camera 12. The monitoring area storing section 144 stores the monitoring scope to be monitored by all the monitoring cameras 12, and each of the monitoring areas that is assigned to each of the monitoring cameras 12. The dead area deciding section 143 decides a dead area, i.e., an area which is not captured as the monitoring scope because one of the monitoring cameras 12 has changed its monitoring area by zooming in the abnormal position. The dead area compensation section 145 decides a method for capturing the dead area that is decided by the monitoring area storing section 144, by using the other monitoring cameras 12 except the monitoring camera 12 which is monitoring the abnormality. The control signal output section 146 outputs a control signal for controlling each of the positions and each of the scaling factors of the monitoring cameras 12, based on the method that is decided by the dead area compensation section 145. Moreover, the changing of the scaling factor of the monitoring camera 12, i.e., the mechanism for zooming, may be an optical zoom or a digital zoom.

According to the configuration described above, the camera system 10 can capture the specific area without the dead area.

Figure 3:
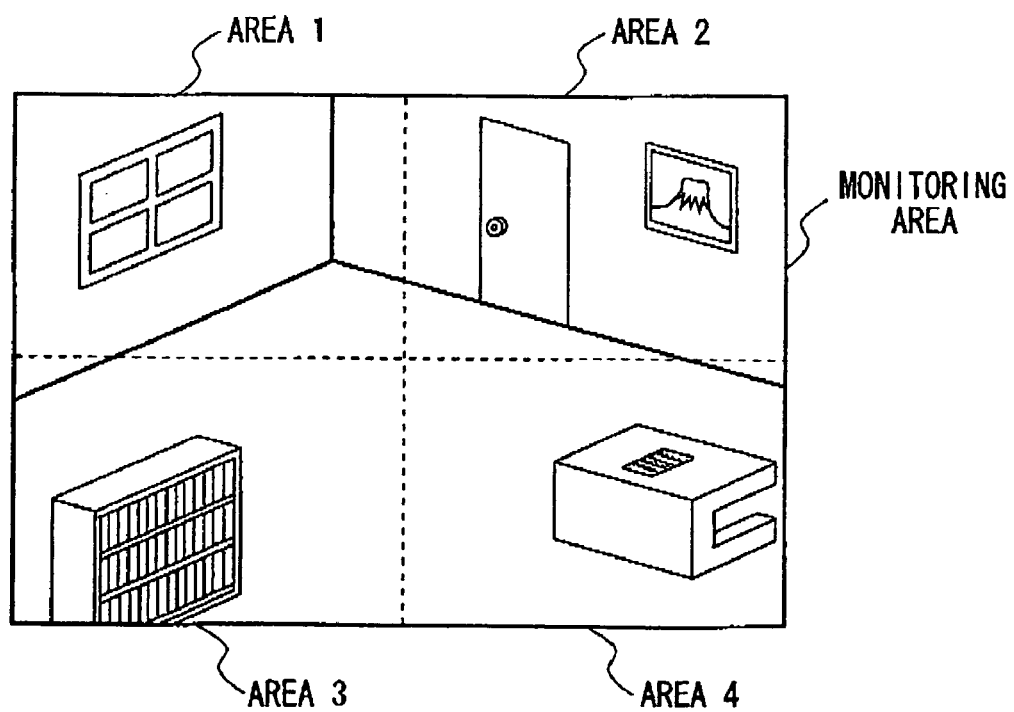
FIG. 3 is an example of the monitoring scope in the camera system 10.

FIG. 3 is an example of the monitoring scope in the camera system 10. In this embodiment, the camera system 10 monitors the monitoring scope that is shown in FIG. 3 by using four monitoring cameras 12 (cameras 1-4). Normally, the camera 1 monitors Area 1, the camera 2 monitors Area 2, the camera 3 monitors Area 3, and the camera 4 monitors Area 4. The above described monitoring area storing section 144 stores the monitoring scope and each of the monitoring areas as shown in this figure. The abnormality detector 141 decides whether the abnormality has occurred based on some changes in the images captured by the cameras 1-4.

Figure 4:
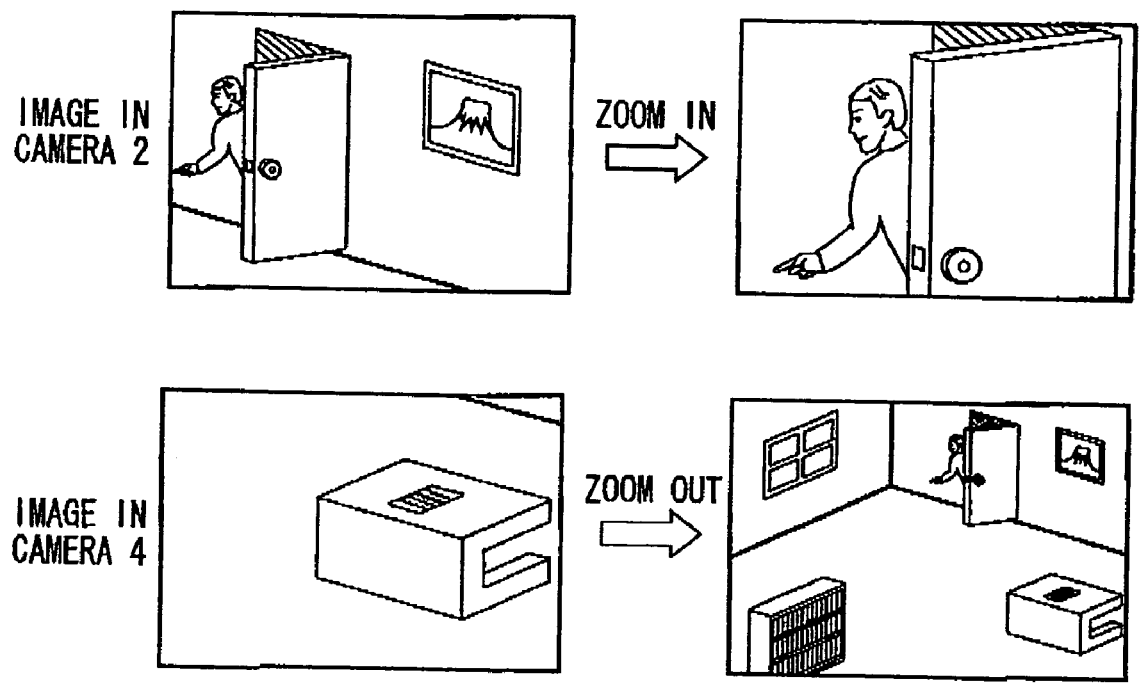
FIG. 4 is a drawing exemplary illustrating an operation of the camera system 10 when the abnormality detector 141 detects an abnormality in Area 2 in FIG. 3.

FIG. 4 is a drawing exemplary illustrating an operation of the camera system 10 when the abnormality detector 141 detects an abnormality in Area 2 in FIG. 3. In this example, an intruder enters a room from a door, which is included in the area 2. At first, the abnormality detector 141 detects the abnormality based on the change of the images in camera 2 that is monitoring Area 2. Next, the zooming method deciding section 142 selects the camera 2 among the four cameras, in which the abnormality in the image has occurred, and then decides a monitoring area to be captured by zooming into the intruder.

The dead area deciding section 143 decides a dead area, i.e., an area which is not captured as the monitoring scope because the camera 2 has changed its monitoring area for the purpose of zooming into the intruder. In this case, the dead area deciding section 143 decides that a tableau, upper part of the door, and lower part of the door are in the dead area.

The dead area compensation section 145 selects one of the monitoring cameras from the cameras 1, 3, and 4, in order to capture the dead area that is decided by the dead area deciding section 143, and then decides each of the new monitoring areas of the cameras 1, 2, and 4. For example, in this case, the dead area compensation section 145 selects the camera 4 as the monitoring camera to capture the dead area in Area 2, and then, magnifies the monitoring area of the camera 4 so that the dead area of Area 2 is included in the monitoring area of the camera 4.

Next, the control signal output section 146 outputs each of the control signals for controlling the positions and scaling factors of the monitoring cameras 12 to each of the monitoring cameras 12 based on the each of new monitoring areas of the monitoring cameras 12, where the areas are decided by the zooming method deciding section 142 and the dead area compensation section 145.

Each of the monitoring cameras 12 changes its positions and scaling factor according to each of the control signals. For example, the camera 2 zooms into the subject and the camera 4 zooms out so that Area 2 and Area 4 are included in an image.

In this case, the dead area compensation section 145 may change each of the monitoring areas of the plural monitoring cameras in order to capture the dead area of the camera 2. For example, we assume that Area 2 is divided into four equal parts. If the camera 2 zooms into the top right area, it is necessary to magnify the monitoring area of the camera 4 by a factor of 2 along the top direction and left direction in order to cover the dead area only by using the camera 4. On the contrary, if both the camera 1 and camera 4 are used to cover the dead area, the camera 1 has only to magnify its monitoring area along the right direction by a factor of 1.5, and the camera 4 has only to magnify its monitoring area along the top direction by a factor of 1.5.

In other words, the dead area, which occurs when one of the cameras zooms in, is captured by other cameras, by the operations of zooming out. Therefore, operations of zooming out of each camera can be minimized. Accordingly, it is possible to eliminate the dead area in the monitoring area with minimum deterioration in accuracy of the image captured by each camera.

In addition, the camera controller 14 may regard recognition of a new subject as a trigger, and control one monitoring camera to zoom into the new subject. In this case, the camera controller 14 controls the other monitoring cameras to zoom out the new subject, thereby capturing the dead area. For example, the camera controller 14 distinguishes between an abnormality caused by an appearance of a new subject and an abnormality caused by the movement wellknown subject when detecting the abnormality in the monitoring scope. Then, the camera controller 14 regards the abnormality of the appearance of the new subject as a trigger, and then controls the cameras to zoom into the new subject.

Moreover, the camera controller 14 may distinguish between an abnormality caused by an appearance of persons and an abnormality caused by subjects other than persons, and then, control the cameras to zoom into the persons preferentially. The camera controller 14 decides whether the abnormality is caused by persons or not based on whether the image has some appropriate colors as a person's skin. In addition, the camera controller 14 decides whether the abnormality is caused by persons or not based on the size of the subject. If the camera is capable of detecting the infrared radiation, the camera controller 14 may decide whether the abnormality is caused by persons or not based on the temperature of the subject detected from the image.

A second example of the camera controller 14 will be explained below. Components having the same or similar functions as those in the first example are assigned with the same reference numerals and will not be described. According to this example, the camera controller 14 adjusts both an exposure of one monitoring camera 12 and an exposure of the other monitoring cameras 12 differently when a region of which luminance exceeds a dynamic range of the monitoring cameras 12 is lager than a predetermined area out of the monitoring scope. Thus, the whole dynamic range of the camera system 10 is increased, and consequently, it is possible to obtain clear monitoring images without overexposure or underexposure.

Figure 5:
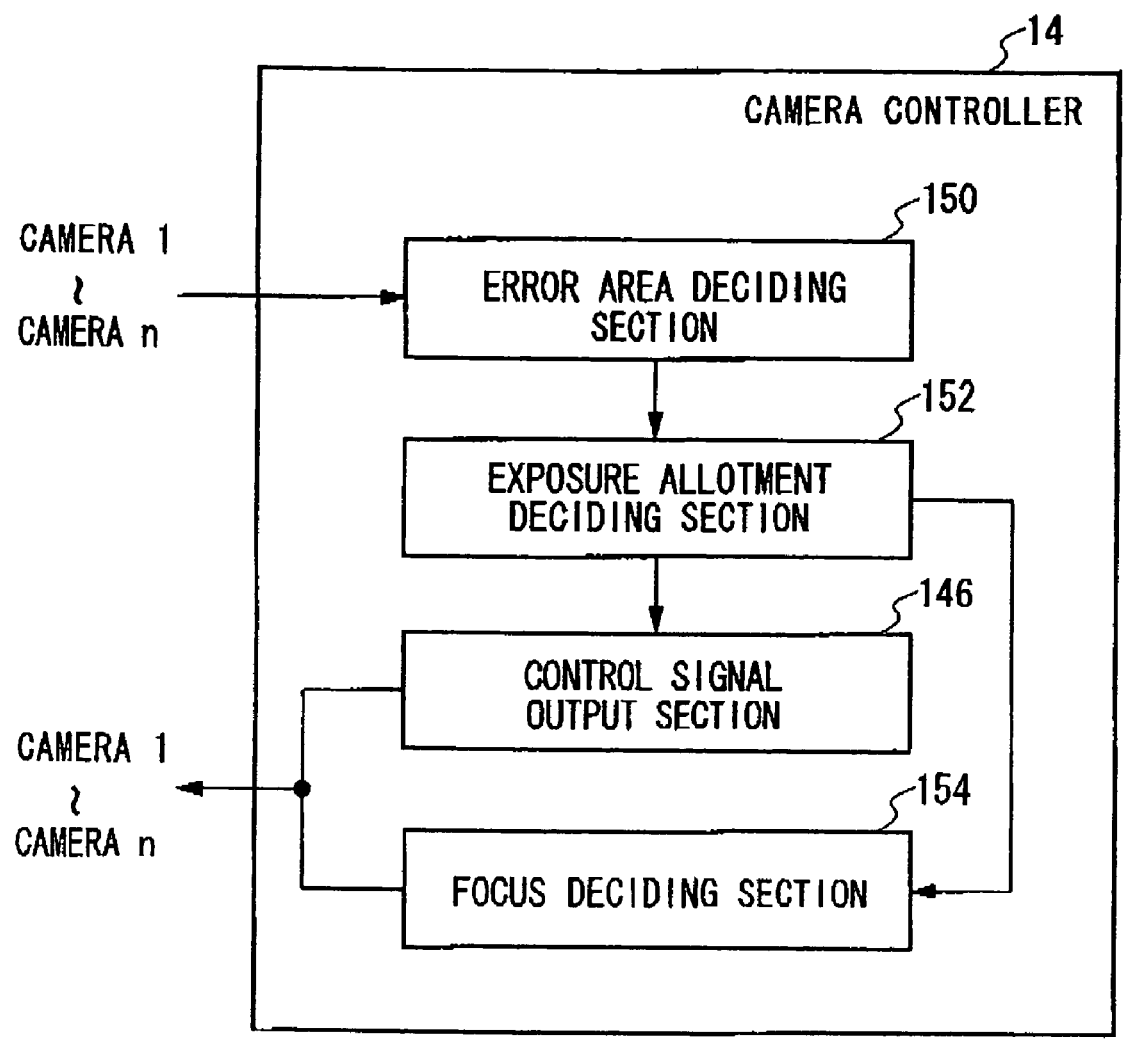
FIG. 5 is a second example showing the functional diagram of the camera controller 14.

FIG. 5 is a functional diagram showing the camera controller 14 in this example. The camera controller 14 includes an error region deciding section 150, an exposure allotment deciding section 152, the control signal output section 146 and a focus deciding section 154. The error region deciding section 150 detects an error region in which the overexposed region or the underexposed region is included in the images corresponding to the predetermined monitoring scope. The error region is the region, of which luminance is beyond a dynamic range of the monitoring cameras 12 and the region is larger than a predetermined area. Although the region is saturated with light, or the region is lacking of light, if these regions are too small, the error region deciding section 150 excludes these such small regions from the subject to be detected. The predetermined area used when deciding whether a region should be excluded or not may be provided as a region having at least a pixel. The predetermined area may be arbitrarily provided by pixel measure.

The exposure allotment deciding section 152 allots each range of the luminance to each monitoring camera 12. Specifically, the exposure allotment deciding section 152 selects an appropriate monitoring camera 12 in order to capture the error region detected by the error area deciding section 150. For example, the appropriate monitoring camera 12 is a monitoring camera 12 including the error region within its image of the monitoring area. The exposure allotment deciding section 152 controls the selected monitoring camera 12 in order to adjust the exposure in accordance with the error region optimally. Next the exposure allotment deciding section 152 adjusts the exposures of the other monitoring cameras 12 in accordance with a region except the error region in the images of the monitoring scope. The control signal output section 146 may output a control signal for changing at least one of the positions and scaling factor, so that the error region is positioned at the center of the image and the error region occupies a greater part of the image. In addition, the control signal output section 146 may output a control signal for controlling each of the positions and scaling factors of the plural monitoring cameras 12, so that the other monitoring cameras 12 capture the region except the error region. In addition, the error region is an example of the high luminance region in the present invention.

The focus deciding section 154 adjusts focuses of each of the plural monitoring cameras 12 in accordance with the regions, which are captured with the exposures adjusted by the exposure allotment deciding section 152, respectively. For example, the focus deciding section 154 outputs a control signal for adjusting the focus of the monitoring camera 12 in accordance with the error region in the image, and outputs control signals for adjusting the focuses of each of the other monitoring cameras 12 in accordance with a region except the error region.

Figure 6:
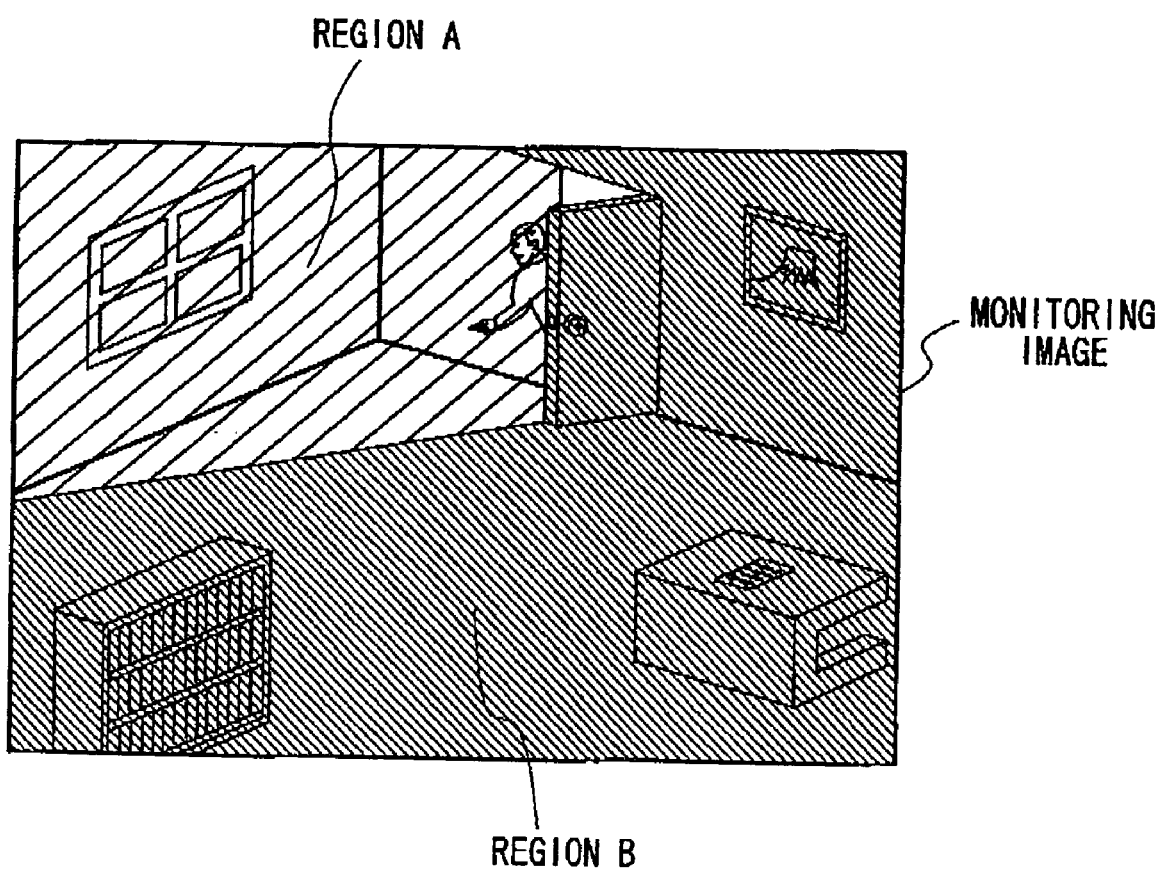
FIG. 6 is an example of the monitoring image when the degree of the contrasting in monitoring scope is large.

FIG. 6 is an example of the monitoring image when the degree of the contrasting in monitoring scope is large. In the monitoring scope, the region A in the monitoring scope is a bright region, in which outside light shines. On the contrary, the region B is darker than the region A. The contrast between the region A and the region B exceeds the dynamic range of one monitoring camera 12. In this case, the error region deciding section 150 decides that the luminance of the region B is not within the dynamic range of the monitoring camera 12 if the exposure of the monitoring camera 12 is adjusted in accordance with the region A. Similarly, the error region deciding section 150 decides that the luminance of the region A is not within the dynamic range of the monitoring camera 12 if the exposure of the monitoring camera is adjusted in accordance with the region B. When a region being not within the dynamic range is larger than a predetermined area, the error region deciding section 150 detects this region as the error region. For example, in this case, the error region deciding section 150 detects the bright region A as the error region. The exposure allotment deciding section 152 outputs a control signal in order to adjust the exposure of the camera 1 in accordance with the region A, and the most part of the region A detected as the error region is included in the images captured by the camera 1. The control signal output section 146 outputs the signal to control at least one of the position and scaling factor of the camera 1 so that the camera 1 captures all of the region A.

The exposure allotment deciding section 152 optimizes exposures of the camera 1, the camera 2, and the camera 4 respectively in the region B excluding the region A in the monitoring scope. The exposure allotment deciding section 152 outputs a control signal for optimizing each of the exposures of the cameras 2-4 in accordance with each of the monitoring areas when there is a contrast within the region B. The control signal output section 146 outputs the signal for controlling at least one of the positions and scaling factor of the cameras 2-4 so that the cameras 2-4 capture the whole of the region B. The control signal output section 146 outputs the signal for controlling at least one of the position and scaling factor of the of the cameras 2-4 so that the cameras 2-4 capture the dead area which occurs as the result of the changing of at least one of the positions and the scaling factors of the cameras 2-4.

The focus deciding section 154 adjusts the focus of the camera 1 in accordance with the area captured with the exposure decided by the exposure allotment deciding section 152, i.e., the region A. Each of the focuses of the cameras 2-4 is adjusted in accordance with each of the areas captured with each of the exposures decided by the exposure allotment deciding section 152.

As apparent from the explanations above, according to the camera system 10 in this example, the dynamic range of the camera system 10 is magnified when a region, of which luminance is beyond a dynamic range of the monitoring cameras 12, is larger than a predetermined area in the monitoring scope because each of the exposures of the monitoring cameras 12 are adjusted differently. Thus, a clear image without white region caused by excess of the light intensity or a black region caused by lack of the light intensity can be acquired. According to the present invention, a camera system that monitors a specific scope in detail without dead area can be provided.

Although the present invention has been described by way of exemplary embodiments, it should be understood that those skilled in the art might make many changes and substitutions without departing from the spirit and the scope of the present invention which is defined only by the appended claims.

What is claimed is:

1. A camera system for capturing an image of a predetermined scope, having a plurality of monitoring cameras operable to change monitoring areas respectively, comprising:

a camera controller, wherein when changing a monitoring area of one of the monitoring cameras, said camera controller controls the other monitoring cameras to monitor a dead area that is outside of the monitoring area of the one of the monitoring cameras, wherein when a subject enters the monitoring area of any of the plurality of monitoring cameras, said camera controller controls a selected one of the monitoring cameras, which is monitoring a monitoring area into which the subject has entered into, to zoom into the subject, and said camera controller controls the other non-selected monitoring cameras to monitor the dead area by zooming out the subject.

2. The camera system as claimed in claim 1, wherein said camera controller regards recognition of a new subject as a trigger, and controls the monitoring camera to zoom into the new subject.

3. The camera system as claimed in claim 1, wherein said camera controller adjusts both an exposure of one monitoring camera and an exposure of the other monitoring cameras differently when a region of which luminance is beyond a dynamic range of the monitoring cameras is larger than a predetermined area in the predetermined scope.

4. The camera system as claimed in claim 3, wherein said camera controller adjusts the exposure of the monitoring camera in accordance with a high luminance region, of which average luminance is the highest in the predetermined scope, and adjusts the exposures of the other monitoring cameras in accordance with a region except the high luminance region in the predetermined scope.

5. The camera system as claimed in claim 3 wherein said camera controller adjusts each of focuses of the monitoring camera and the other monitoring cameras in accordance with the regions captured with the adjusted exposures, respectively.

6. A camera control method for monitoring a predetermined scope by a plurality of monitoring cameras operable to change monitoring areas respectively, comprising a step of: when changing a monitoring area of one of the monitoring cameras, controlling the other monitoring cameras to monitor a dead area that is outside of the monitoring area of the one of the monitoring cameras, wherein when a subject enters the monitoring area of any of the plurality of monitoring cameras, said camera controller controls a selected one of the monitoring cameras, which is monitoring a monitoring area into which the subject has entered into, to zoom into the subject, and said camera controller controls the other non-selected monitoring cameras to monitor the dead area by zooming out the subject.

7. A computer program medium storing thereon a program for a camera system in order to monitor a predetermined scope by a plurality of monitoring cameras operable to change monitoring areas respectively, the program comprising:

a camera controlling module, wherein when changing its monitoring area of one of the monitoring cameras, said camera controlling module controls the other monitoring cameras to monitor a dead area that is outside of the monitoring area of the one of the monitoring cameras, wherein when a subject enters the monitoring area of any of the plurality of monitoring cameras, said camera controller controls a selected one of the monitoring cameras, which is monitoring a monitoring area into which the subject has entered into, to zoom into the subject, and said camera controller controls the other non-selected monitoring cameras to monitor the dead area by zooming out the subject.

* * * * *